No. 765,409.

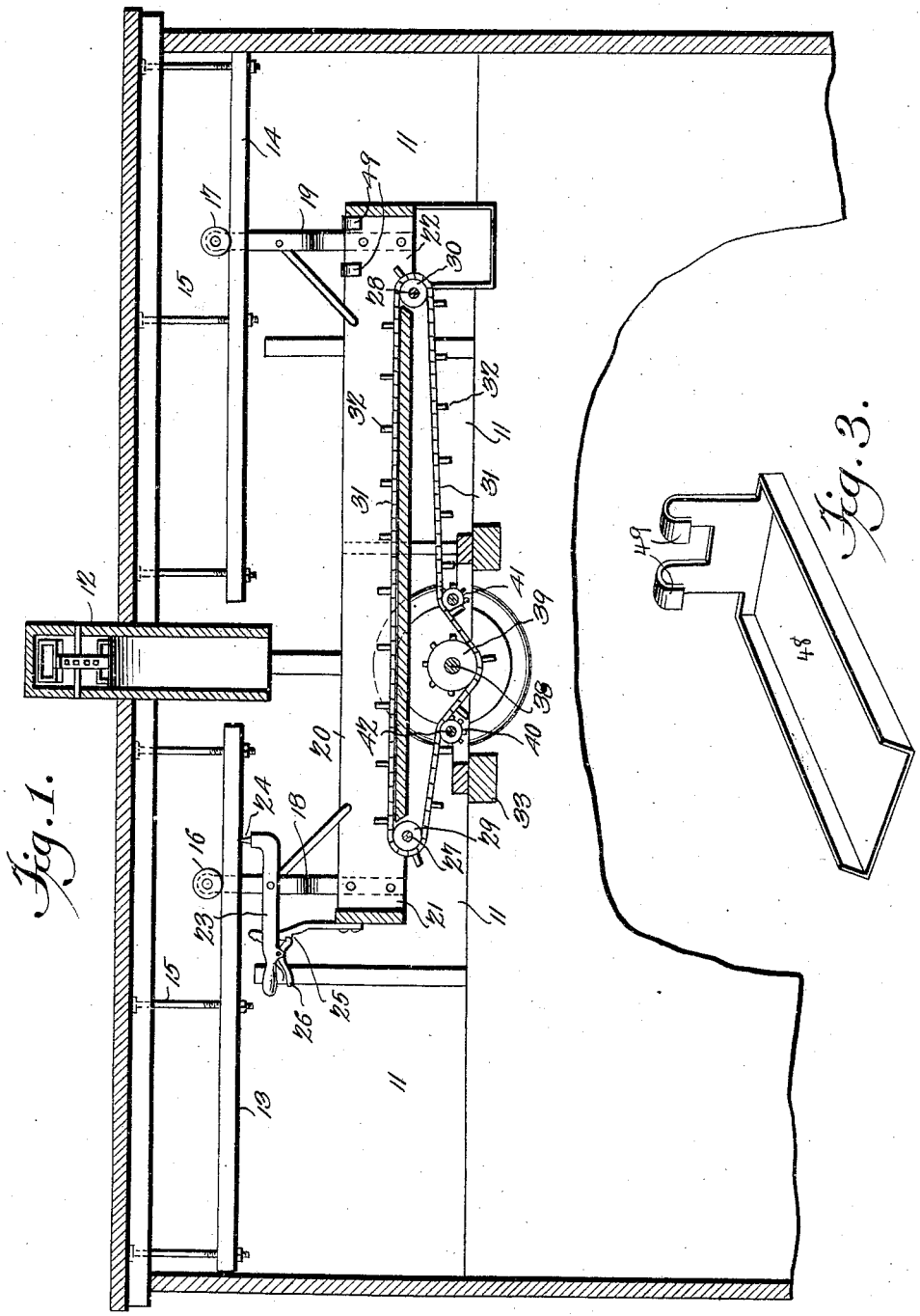

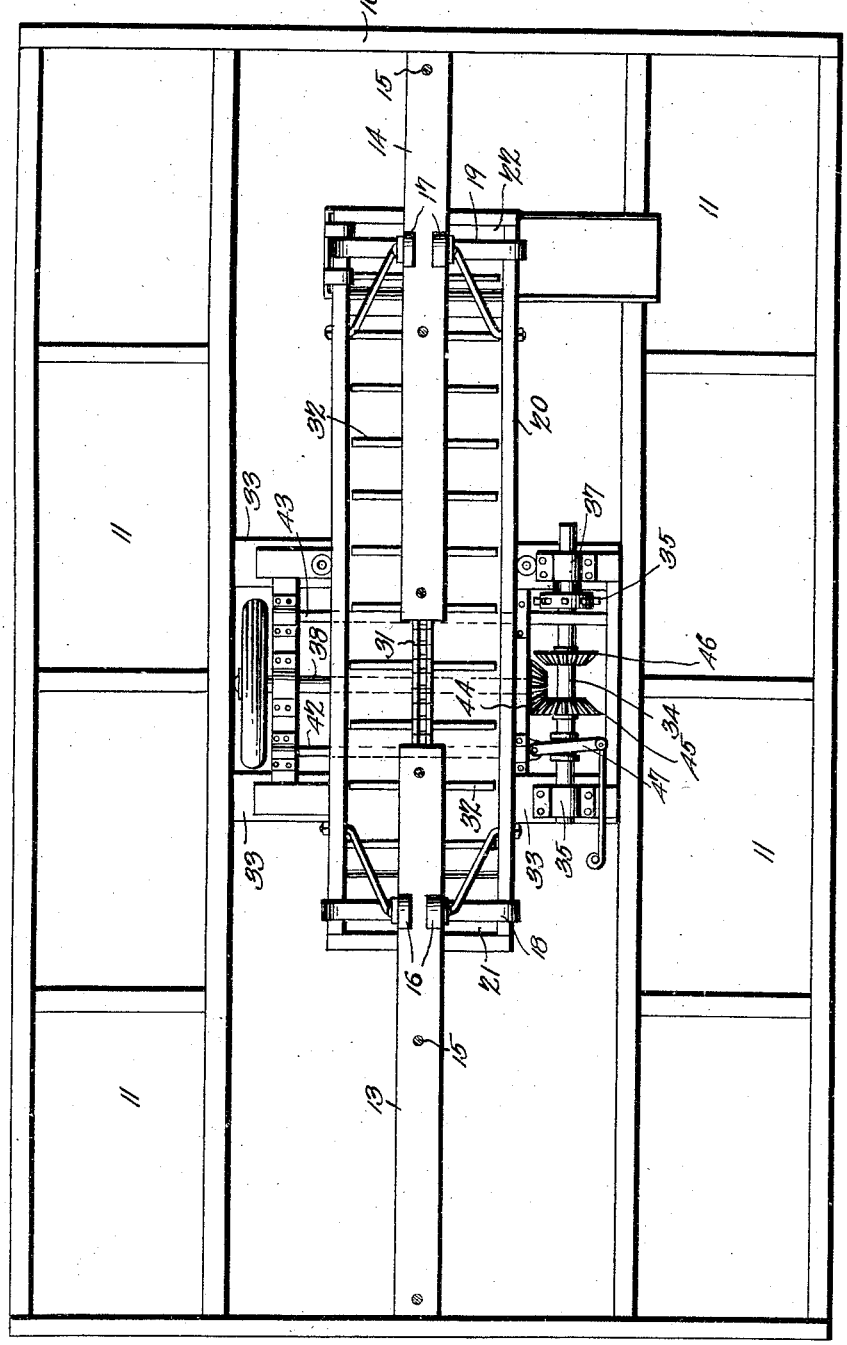

Patented July 19, 1904.

UNITED STATES PATENT OFFICE.

AUGUST WITTERICH, OF RANKIN, ILLINOIS.

GRAIN-DISTRIBUTER.

SPECIFICATION forming part of Letters Patent No. 765,409, dated July 19, 1904.

Application filed April 27, 1903. Serial No. 154,486. (No model.)

*To all whom it may concern:*

Be it known that I, AUGUST WITTERICH, a citizen of the United States, residing at Rankin, in the county of Vermilion and State of Illinois, have invented a new and useful Grain-Distributer, of which the following is a specification.

This invention relates to devices employed for distributing grain and other similar material in elevators and storehouses, and is applicable to any size of such structures and adapted to distribute grain of all kinds to any desired point from a central delivery, and has for its object to produce a simply-constructed and easily-operated apparatus which is adapted more particularly to the smaller elevators and storehouses; and the invention consists in certain novel features of construction, as hereinafter shown and described, and specified in the claims.

In the drawings illustrative of the invention, in which corresponding parts are denoted by like designating characters, Figure 1 is a longitudinal sectional elevation of a conventional storehouse with the improvements applied therein. Fig. 2 is a plan view with the roof removed. Fig. 3 is a perspective view of the lateral spout detached.

The storehouse is indicated at 10 divided interiorly into spaced bins 11 and with an elevating means of any suitable form represented at 12 and arranged to deliver the material centrally of the storehouse above the bins. Suspended longitudinally of the storehouse, preferably centrally thereof, are alined tracks or guide-rails 13 14, the tracks supported, as by suspension-rods 15, as shown. Suspended movably upon the tracks 13 14, as by bearing-rollers 16 17 and hangers 18 19, is a chute 20, having discharge-openings 21 22 at the ends, the chute being thus supported in horizontal position and movable from end to end of the building, as indicated. Connected to the chute 20, preferably to one of the hangers 18 or 19, is a lock-lever 23, having a spur 24 at one end adapted for engagement with the under side of the guide-rails and held in any desired position by a segmental rack-bar 25 and pawl 26, as shown, by which means the chute may be firmly locked at any required point to the rails. Mounted for rotation in the ends of the chute 20 are transverse shafts 27 28, carrying sprocket-wheels 29 30, over which an endless chain 31 operates, the chain having spaced transverse carrier-flights 32, as shown, the flights adapted to convey the material received from the elevator 12 along the chute and discharge it from the openings 21 or 22, according as to which direction the chain and its flights may be moved.

The chain-operating mechanism is supported upon a frame 33 beneath the chute 20 and consists of a main drive-shaft 34, adapted to be operated in any suitable manner, as by a chain running over a sprocket-wheel 35; but as the motive power by which the apparatus is operated is no part of the present invention it is not further illustrated.

Any power means may be employed for operating the device, and I do not therefore wish to be limited to any specific mechanism for this purpose.

The shaft 34 is supported in bearings 36 and 37 on the frame 33 and is slidable longitudinally therein, the sprocket-wheel 35 being held from lateral movement between the bearings 36 37 and rotative with the shaft, as by a feather and key, in the usual manner.

Mounted for rotation upon the frame 33 transversely of the chute 20 is a shaft 38, carrying a sprocket-wheel 39 beneath the under portion of the chain 31, the chain held in operative engagement with the sprocket-wheel by idler-rollers 40 41 upon shafts 42 43, mounted upon the frame 33, as shown.

The shaft 38 is provided with a bevel-gear 44, with which similar gears 45 46 upon the shaft 34 are adapted to be alternately engaged as the shaft is moved longitudinally through its bearings. The shaft 34 will be thus moved in its bearings by a lever 47, as shown in Fig. 2.

The distance between the gears 45 46 will be sufficient so that when the shaft 34 is placed centrally of its longitudinal movement both gears will be out of engagement with the gear 44 and the chain 31 not effected by the motion of the shaft 34. Then when the shaft 34 is moved in one direction the gear 45 will be engaged with the gear 44 and the chain rotated in one direction, and when the shaft is moved in the opposite direction the gears 46 and 44 will be engaged and the motion reversed. By this means the chain may be rotated in either direction to discharge the material from the openings 21 or 22, as may be required.

A lateral chute or spout 48 is provided, which may be suspended beneath the openings 21 or 22, as by hangers 49, and adapted to conduct the material to the various bins 11, as indicated. By this simple arrangement it is obvious the chute 20, with its endless chain of conveyer-flights, may be adjusted to bring the discharge-openings 21 or 22 opposite any of the various bins 11 and conduct the material to any bin in the structure by means of the lateral spout 48.

The apparatus is very simple in construction, easily operated, and applicable to any size or form of storehouse or other receptacle for grain and may be also adapted to any kind or condition of material which can be handled by devices of this or a similar character.

Having thus described the invention, what is claimed is—

1. In a device of the character described, a receiving structure or storehouse, an elevator within said storehouse, horizontally-disposed tracks in said storehouse, a chute mounted upon said tracks and reciprocally movable thereon beneath the discharge from said elevator, means for discharging the material from said chute and a lock-lever carried by said chute operative against said track to detachably lock said chute to said track at any desired point, substantially as described.

2. The combination with an elevator, of a chute mounted for reciprocal movement upon horizontally-disposed tracks, means for discharging the material from said chute, and a lock-lever carried by said chute and operative against said track to detachably lock said chute to said track.

In testimony that I claim the foregoing as my own I have hereto affixed my signature in the presence of two witnesses.

AUGUST WITTERICH.

Witnesses:
   GEO. H. WIELAND,
   FRANK C. SEIDEL.